United States Patent
Chan et al.

(10) Patent No.: US 11,005,656 B2
(45) Date of Patent: May 11, 2021

(54) EMBEDDING INFORMATION IN ELLIPTIC CURVE BASE POINT

(71) Applicant: ARRIS Enterprises LLC, Suwanee, GA (US)

(72) Inventors: Tat Keung Chan, San Diego, CA (US); Alexander Medvinsky, San Diego, CA (US); Eric J. Sprunk, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 228 days.

(21) Appl. No.: 16/213,068

(22) Filed: Dec. 7, 2018

(65) Prior Publication Data

US 2020/0186346 A1 Jun. 11, 2020

(51) Int. Cl.
*H04L 29/06* (2006.01)
*H04L 9/30* (2006.01)
*H04L 9/32* (2006.01)

(52) U.S. Cl.
CPC .......... *H04L 9/3066* (2013.01); *H04L 9/3242* (2013.01); *H04L 65/607* (2013.01)

(58) Field of Classification Search
CPC .... H04L 9/3066; H04L 9/3242; H04L 65/607
See application file for complete search history.

(56) References Cited

U.S. PATENT DOCUMENTS

| | | | | |
|---|---|---|---|---|
| 8,478,988 B2* | 7/2013 | Nguyen | ............... | H04L 9/3271 713/155 |
| 10,129,026 B2* | 11/2018 | Brown | ............... | H04L 9/0861 |
| 2005/0193198 A1* | 9/2005 | Livowsky | ............. | H04L 9/3231 713/168 |
| 2007/0189527 A1* | 8/2007 | Brown | ............... | H04L 9/0869 380/44 |
| 2012/0102328 A1* | 4/2012 | Hui | ................. | H04L 12/2876 713/175 |
| 2012/0237030 A1* | 9/2012 | Ghouti | ............... | H04L 9/3066 380/255 |
| 2012/0243680 A1* | 9/2012 | Little | .................. | H04L 9/3252 380/30 |
| 2012/0246465 A1* | 9/2012 | Little | .................. | H04L 9/3263 713/156 |
| 2012/0317412 A1* | 12/2012 | Zaverucha | ............ | H04L 9/3252 713/156 |
| 2013/0064363 A2* | 3/2013 | Little | .................. | H04L 9/3066 380/30 |
| 2013/0290712 A1* | 10/2013 | Zaverucha | ............ | H04L 9/3242 713/168 |
| 2014/0064491 A1* | 3/2014 | Ghouti | ............... | H04L 9/3013 380/282 |
| 2015/0333906 A1* | 11/2015 | Rahman | ............... | H04L 9/0869 380/44 |
| 2017/0063534 A1* | 3/2017 | Brown | ................ | H04L 63/10 |
| 2017/0063535 A1* | 3/2017 | Brown | ................ | H04L 9/0869 |

(Continued)

*Primary Examiner* — J. Brant Murphy
*Assistant Examiner* — Stephen T Gundry
(74) *Attorney, Agent, or Firm* — Chernoff, Vilhauer, McClung & Stenzel, LLP

(57) ABSTRACT

A method and system are provided for updating an elliptic curve (EC) base point G, with the EC basepoint used in encryption and coding of video data. A candidate base point G is generated that includes additional data used for validation purposes and checked as a valid base point before transmission and use.

16 Claims, 9 Drawing Sheets

(56) References Cited

U.S. PATENT DOCUMENTS

| | | | |
|---|---|---|---|
| 2017/0063536 A1* | 3/2017 | Brown | H04L 9/3066 |
| 2017/0324556 A1* | 11/2017 | Brown | H04L 9/002 |
| 2018/0115419 A1* | 4/2018 | Bos | H04L 9/3066 |
| 2018/0323973 A1* | 11/2018 | Soukharev | H04L 9/0825 |
| 2018/0324176 A1* | 11/2018 | Campagna | H04L 63/061 |
| 2019/0215154 A1* | 7/2019 | Simplicio, Jr. | H04L 9/3066 |
| 2020/0162242 A1* | 5/2020 | Choo | H04L 9/3247 |
| 2020/0162269 A1* | 5/2020 | Nix | H04L 9/3252 |
| 2020/0259649 A1* | 8/2020 | Garcia Morchon | H04L 9/0838 |

* cited by examiner

EMBEDDING INFORMATION IN ELLIPTIC CURVE BASE POINT

BACKGROUND

1. Field of the Invention

The present invention relates to systems and methods for performing cryptographic operations, and in particular to a system and method for updating an elliptic curve base point.

2. Description of the Related Art

Elliptic-Curve Cryptography (ECC) is an approach to public-key cryptography based on the algebraic structure of elliptic curves over finite fields. ECC is capable of using smaller keys than other forms of public key cryptography for the same level of security, thus providing the designer with a system providing a selectable combination of greater security or smaller keys. ECC has application in key agreements, digital signatures, pseudo-random generators, as well as other cryptographic tasks.

To use ECC, all parties must agree on the elements defining the elliptic curve. These elements are known as the elliptic curve (EC) domain parameters, which include a base point G. The generation of domain parameters is not usually performed by each party because this involves computing the number of points on a curve which is time-consuming and can be troublesome to implement. As a result, domain parameters of elliptic curves for several common field sizes have been made available as "standard curves" or "named curves." Such domain parameters are commonly known as "standard curves" or "named curves," which can be referenced by name or unique identifier.

However, reusing the same base point defined in standard curves may pose security risks, as the same set of parameters are used extensively by many entities. What is needed is a system and method for securely updating the ECC base point domain parameters used by entities. The system and method presented below satisfies that need.

SUMMARY

To address the requirements described above, the present invention discloses a method, apparatus, article of manufacture, and a memory structure for selecting a base point domain parameter G of an elliptic curve (EC). In one embodiment, the method comprises (a) generating a base point domain parameter G of an elliptic curve (EC), the base point domain parameter x-coordinate ($G_x$) comprising a candidate base point domain parameter x-coordinate ($G_x$) first portion, and a candidate base point domain parameter x-coordinate ($G_x$) second portion, wherein at least a portion of the base point domain parameter x-coordinate ($G_x$) first portion is random and the base point domain parameter x-coordinate ($G_x$) second portion comprises information for authenticating the generated base point domain parameter x-coordinate ($G_x$), generating one of two possible y-coordinates ($G_y$) based on the x-coordinate and the curve equation, (b) determining if the generated base point domain parameter $G=(G_x,G_y)$ is a valid domain parameter of the elliptic curve (EC), (c) if the generated base point domain parameter G is a not a valid base point domain parameter G, selecting another base point domain parameter G first portion, and repeating steps (a)-(c); and (d) if the generated base point domain parameter G is a valid base point domain parameter G, communicating the generated base point domain parameter G to another entity for use as the generated base point domain parameter G in at least one EC based cryptographic operation.

In one embodiment, determining if the generated base point domain parameter G is a valid domain parameter of the elliptic curve (EC) comprises computing a product of a cofactor (h) of the elliptic curve (EC) and the generated base point domain parameter G, computing a product of an order (n) of the generated base point domain parameter G, the cofactor (h) of the elliptic curve (EC) and the generated base point domain parameter G, and determining that the generated base point domain parameter G is a valid base point domain parameter G only if the product of a cofactor (h) of the elliptic curve (EC) and the generated base point domain parameter G is not the additive identity of the elliptic curve (EC) and if the product of the order (n) of the generated base point domain parameter G, the cofactor (h) of the elliptic curve and the generated base point domain parameter G is the additive identity of the elliptic curve (EC), otherwise determine that the generated base point parameter G is not a valid domain parameter.

In another embodiment, steps (a)-(d) are performed by first entity and the another entity is a second entity, and communicating the generated base point domain parameter G to another entity for use as the generated base point domain parameter G in at least one EC based cryptographic operation comprises transmitting the generated base point domain parameter G from the first entity to the second entity; and validating, in the second entity, the generated base point domain parameter G using the base point domain parameter G second portion.

Other embodiments are evidenced by a processor communicatively coupled to a memory storing processor instructions or other means for performing the foregoing operations. When implemented, the foregoing allows update of EC base point for use in ECDH key exchange to provide better security. By frequently changing the EC base point, cryptanalysis is made more difficult.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized, and structural changes may be made without departing from the scope of the present invention.

Key Agreement Schemes

A key agreement scheme is a procedure by which two or more parties agree upon a value from which they can subsequently derive one or more keys for use in a symmetric encryption and/or data authentication scheme. Neither party completely determines the key value on their own. Instead, they both contribute to the final key value. And, most important, anyone who observes the exchanges between the two parties cannot tell what the final result will be.

The Diffe-Hellman (DH) key agreement scheme is one such scheme. This scheme is based on multiplication of integers modulo a large prime number, specifically numbers greater than one and less than p, where p is a large prime. The Elliptic Curve Diffe-Hellman key agreement scheme is analogous, but is based instead on addition of points on the EC.

In both schemes, the basic operations are combined to create a primitive function known as a keyed one-way function. A keyed one-way function is a function that takes two inputs, one of which is private (e.g., the key), and produces one output. Importantly, it must be straightforward to calculate the output given both inputs, but at the same time, it must be computationally infeasible to calculate the key, using only the other input and the output. In this way, each party can use their private key without revealing it to anyone else, either the other party or an eavesdropper.

Figure 1:
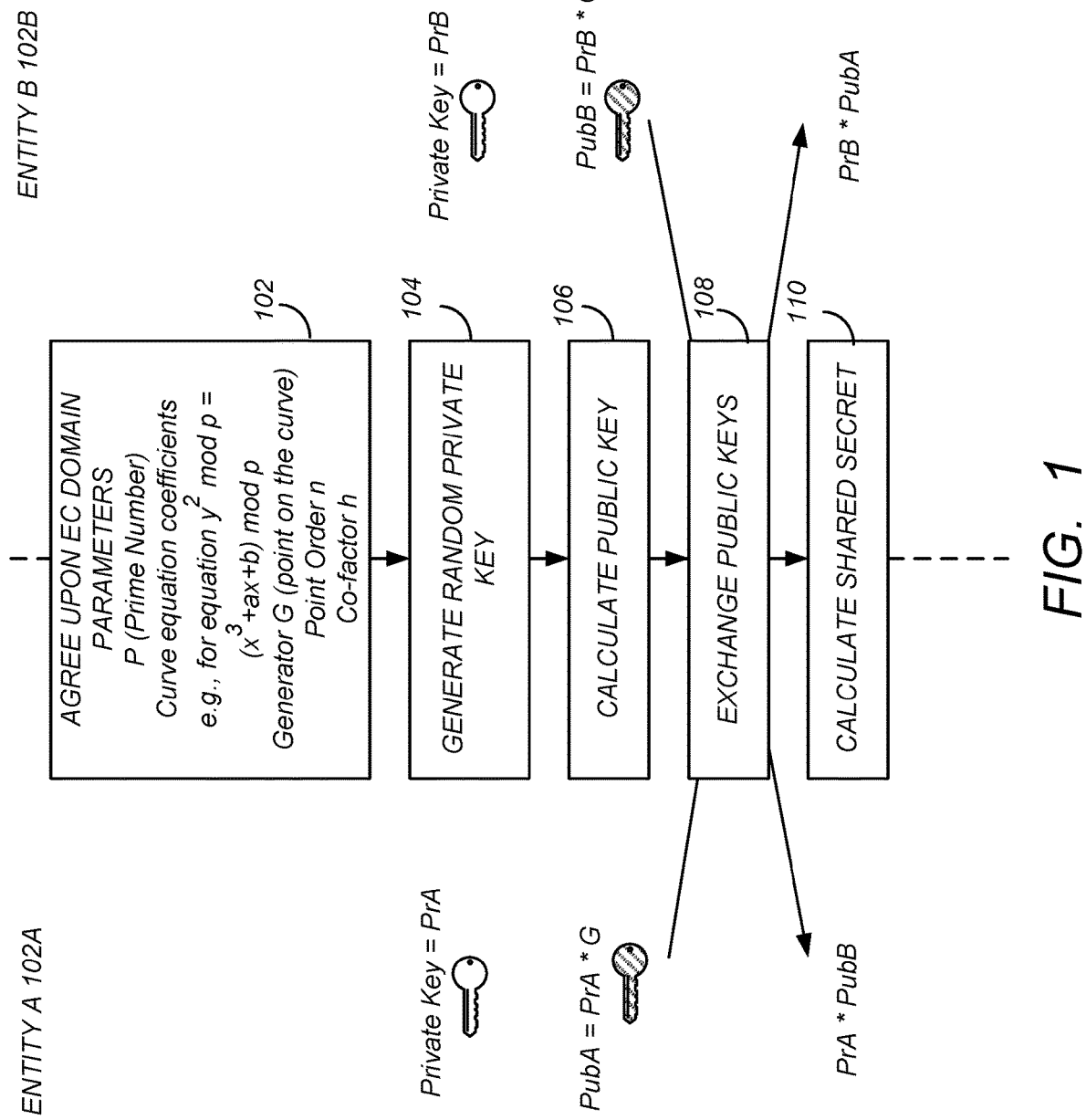
FIG. 1 is a diagram depicting a simple example of the application of a simple key agreement scheme.

FIG. 1 is a diagram depicting a simple example of the application of a simple ECDH key agreement scheme. Entity A 102A and Entity B (hereinafter Alice and Bob respectively), agree upon a set of domain parameters, as shown in block 102. An example of an elliptic curve equation is shown as $y^2$ mod $p=(x^3+ax+b)$ mod p, but other elliptic curve equations are possible.

In block 104, Alice 102A and Bob 102B each generate a random number that will be used as a private key. Next, Alice 102A and Bob 102B each generate a public key according to Private Key * G, as shown in block 106. Note that multiplication of the private key (scalar) by the base point G is not the regular arithmetic multiplication. This means that elliptic curve G is added to itself "Private Key" number of times, where elliptic curve point addition is well known in the art of cryptography. These public keys are exchanged, as shown in block 108. Alice 102A and Bob 102B now calculate their shared secret by multiplying the public key of the other entity by their private key and both end up with the same shared key, as shown in block 110.

In the elliptic-curve Diffie-Hellman scheme, the input and output are points on the curve having particular properties, while the private key is an integer. The keyed one-way function is formed by adding the input to itself, repeatedly, a number of times determined by the value of the key (i.e., multiplying the input by the key). Multiplying a point by an integer is a relatively straightforward calculation, even for curves with a very large underlying field, whereas the inverse operation (i.e., finding out what multiple of a known input point produces a known output point is computationally infeasible, if the underlying field is sufficiently large).

An elliptic curve can be defined as a plane curve over a finite field consisting of points that satisfy a curve equation. For odd prime fields, Elliptic Curve (EC) domain parameters normally include a curve equation, large prime (e.g., 256, 384, 521 etc. bits), order of the curve (usually another slightly smaller prime) and a base point G—a point that is on that Elliptic Curve. For example, the elliptic curve equation may be defined as in Equation (1)

$$y^2 = x^3 + ax = b \quad \text{Equation (1)}$$

and the EC domain parameters include a, b, a large prime P, the order of the curve, and a base point G which is a point on the elliptic curve. Other kinds of fields also exist—for example, an even characteristic where arithmetic is done modulus a characteristic polynomial. In that case, integers are converted to binary polynomials and multiplication or division of two numbers is converted to multiplication or division of polynomials which are then reduce modulus a characteristic polynomial instead of prime. However, a base point G is used as a domain parameter in all variations of EC. Typically, the parties use a standard EC in which the domain parameters, including the base point G are defined and fixed.

Changing the Base Point

As described above, it is beneficial for cryptographic systems to change the base point G from time to time.

Figure 2A:
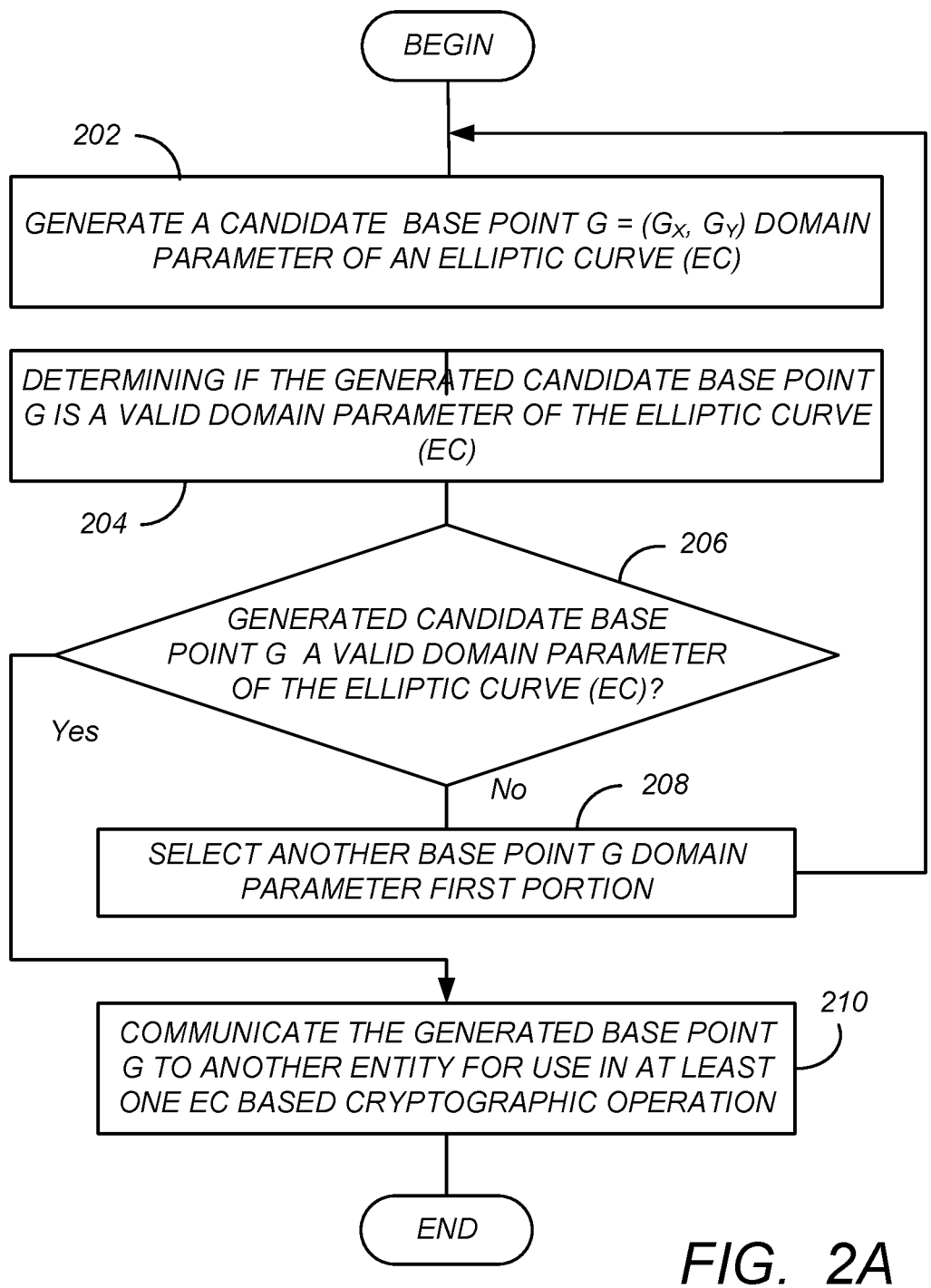
FIGS. 2A-2E are diagrams illustrating exemplary operations that can be used by a cryptographic system to change a cryptographic parameter, in particular, the base point G of an elliptic curve.
Figure 2B:
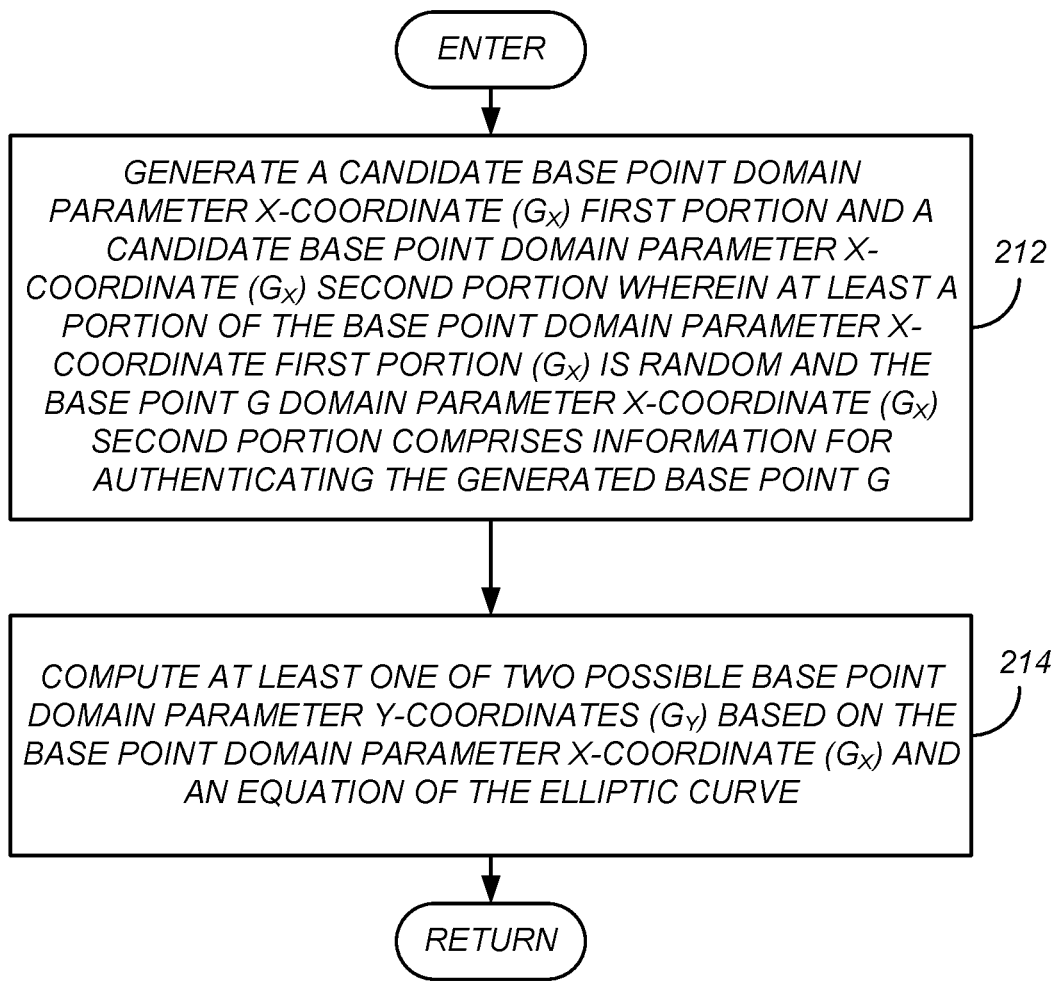
Figure 2C:
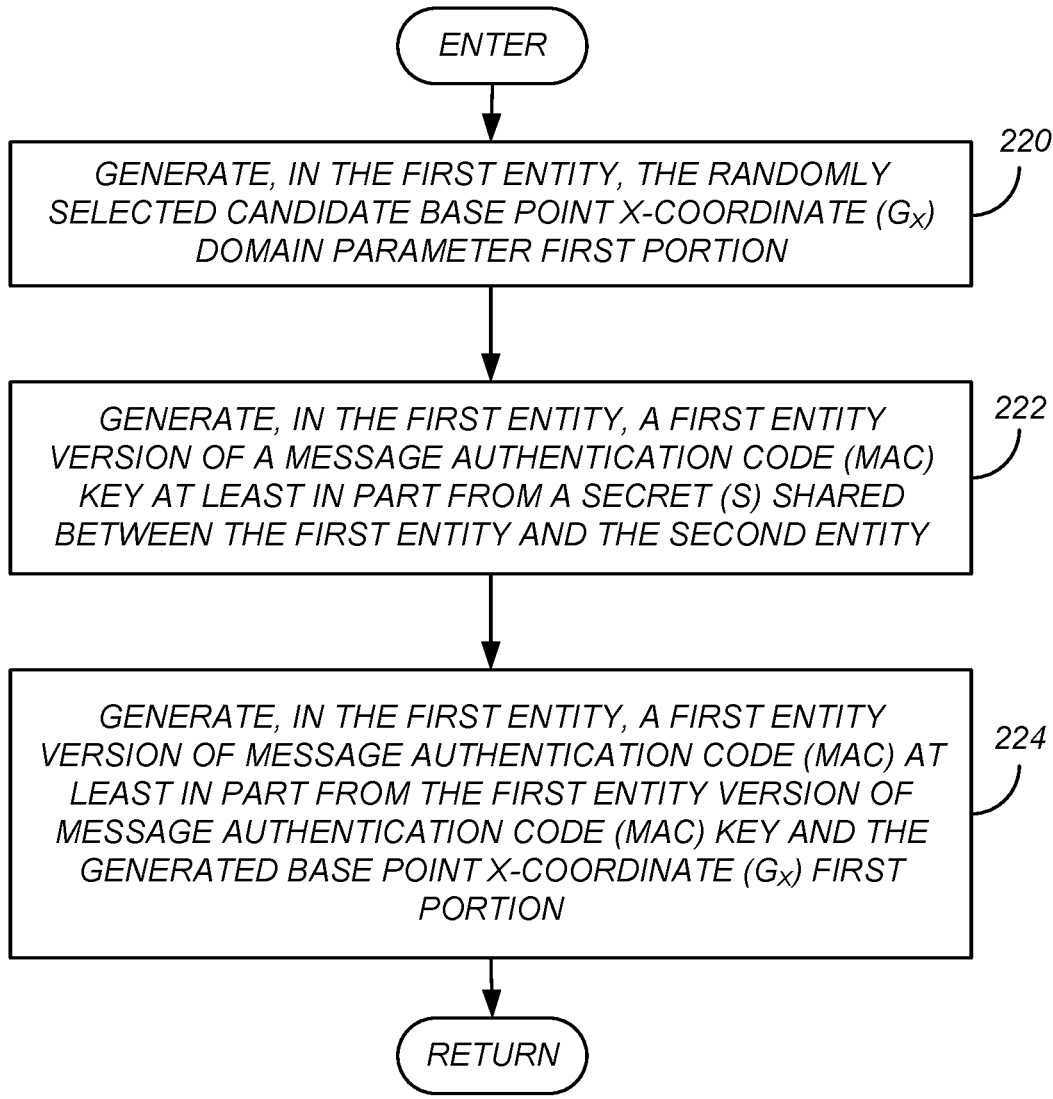

FIGS. 2A-2D are diagrams illustrating exemplary operations that can be used by a cryptographic system of a first entity 102A and a second entity 102B to change a cryptographic parameter, in particular, the base point G of an elliptic curve. FIGS. 2A-2C will be discussed in connection with FIGS. 3A and 3B which illustrate a functional data flow of one embodiment of the operations depicted in FIGS. 2A-2D.

Turning first to FIG. 2A, the process begins with the first entity 102A and the second entity 102B having a shared secret $S_0$. First entity 102A and 102B have also agreed upon an algorithm for generating a key from the shared secret $S_0$.

Figure 3A:
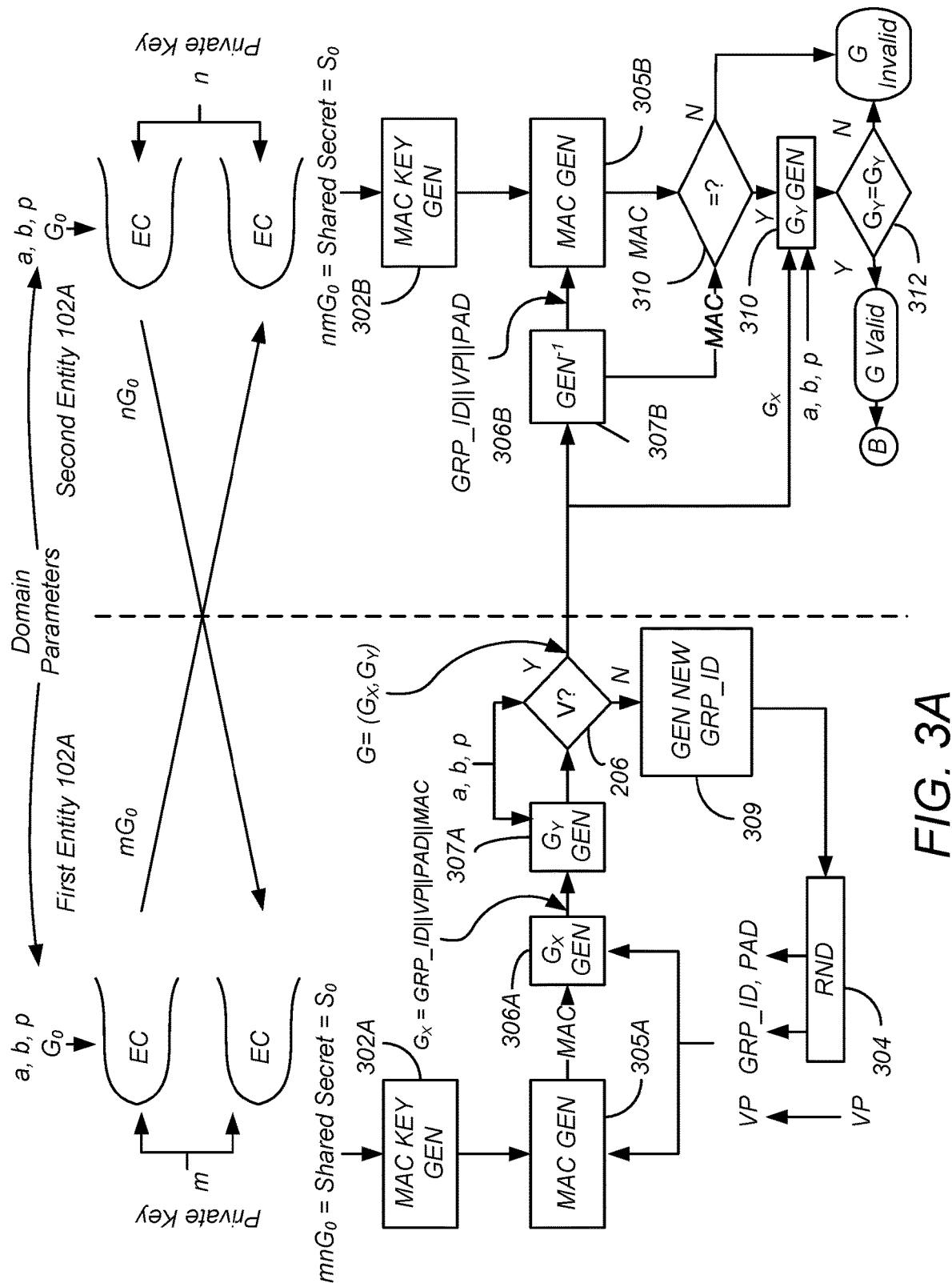
FIG. 3A-3B are is a diagram illustrating an exemplary embodiment of a system implementing the operations described in FIGS. 2A-2E.

FIG. 3A illustrates one technique by which the first entity 102A and the second entity 102B may have a shared secret ($S_0$) using a ECDH secure key exchange, as described in FIG. 1. In this embodiment, the first entity 102A and the second entity 102B agree on a set of domain parameters for an EC curve. In the illustrated embodiment, these domain parameters include a, b, large prime p, and an initial base point $G_0$.

The first entity 102A generates a random private key m and using the agreed upon EC curve parameters, generates public key $mG_0$, which is provided to the second entity 102B. The second entity 102B generates its own private key n, and using the agreed upon EC curve parameters, computes public key $nG_0$, which is provided to the first entity 102A. Using the EC curve parameters, the first entity 102A then computes $mnG_0$ from its private key m and the public key received from the second entity. Likewise, using the EC curve parameters, the second entity 102B computes $nmG_0$ from its private key and the public key received from the first entity. Because of the particular properties of the EC, $mnG_0$ and $nmG_0$ are equal, and each of these values represent the shared secret ($S_0$).

In other embodiments, the shared secret $S_0$ is securely provided to the first entity 102A and the second entity 102B in other ways. For example, in one embodiment, the shared secret $S_0$ is provided to the first entity 102A and the second entity 102B by via a secure communications channel.

Generating a New Base Point

Returning to FIG. 2A, when it is determined that a base point G is to be generated, one of the entities (for illustrative purposes, we consider the first entity 102A) generates a candidate base point $G=(G_x,G_y)$, as shown in block 202. This base point G may be a new basepoint intended to replace the previous basepoint $G_0$ used in an ECC operation, or a new basepoint intended to replace the basepoint available from a set of standard EC domain parameters.

FIG. 2B is a diagram illustrating exemplary operations for generating a candidate basepoint parameter G. In block 212, a candidate base point domain parameter x-coordinate ($G_x$) first portion and a candidate base point domain parameter x-coordinate ($G_x$) second portion is generated. At least a portion of the base point domain parameter x-coordinate ($G_x$) is random. In one embodiment, the base point domain parameter x-coordinate ($G_x$) includes an identifier of the domain parameters (for example, the illustrated group identifier (GRP_ID) for a communication group sharing the domain parameters of the EC of the elliptic curve and session parameters such as the illustrated validity period (VP). The candidate base point domain parameter x-coordinate ($G_x$) second portion comprises information for authenticating the generated candidate base point domain parameter G, for example, the illustrated message authentication code (MAC).

In block 214, least one of two possible base point domain parameter y-coordinates (Gy) is computed based upon the base point domain parameter x-coordinate ($G_x$) and an equation of the elliptic curve (EC).

FIG. 2C is a diagram illustrating one embodiment of the generation of the base point domain parameter x-coordinate ($G_x$) having the candidate base point domain parameter x-coordinate ($G_x$) first portion and the candidate base point domain parameter x-coordinate ($G_x$) second portion shown in block 212 of FIG. 2B. In block 220, a randomly selected candidate base point domain parameter x-coordinate ($G_x$) first portion is generated. FIG. 3A illustrates one embodiment of the generation of a randomly selected candidate base point domain parameter x-coordinate ($G_x$) first portion. In this embodiment, the candidate base point domain parameter x-coordinate ($G_x$) first portion comprises a combination (such as a concatenation) of a randomly chosen group ID (GRP_ID) generated by random number generator 304, an optional base point validity period (VP), and an optional randomly chosen padding field (PAD) to pad $G_x$ up to a required length (if any). The PAD may also be generated by the random number generator 304.

Returning to FIG. 2C, in block 222, a first entity version of a message authentication code (MAC) key is generated at least in part from the shared secret (S). This is illustrated in FIG. 3A by a MAC key generator 302A implementing a key derivation algorithm shared or agreed upon between the first entity 102A and the second entity 102B generates a MAC key from the shared secret $S_0$.

Again in FIG. 2C, the candidate base point domain parameter x-coordinate ($G_x$) second portion is generated. This is illustrated in block 224, in which a first entity version of the message authentication code (MAC) is generated at least in part from the first entity version of the MAC key and the randomly selected candidate base point domain parameter x-coordinate ($G_x$) first portion. This operation is also illustrated in FIG. 3A, as the first entity's MAC generator 305A generates a MAC using the MAC key obtained from the MAC key generator 302A and the candidate base point domain parameter x-coordinate ($G_x$) second portion (in the illustrated embodiment, a concatenation of GRP_ID||VP-||PAD as performed by block 306A). The candidate base point domain parameter x-coordinate ($G_x$) first portion (GRP_ID||VP||PAD) and the candidate base point domain parameter x-coordinate ($G_x$) second portion (MAC) are then combined (in the illustrated embodiment by concatenation to obtain $G_x$=GRP_ID||VP||PAD||MAC). Finally, one of the two possible y-coordinates $G_y$ is computed from $G_x$ based on the curve equation and the final base point domain parameter G=($G_x$, $G_y$) is formed, as shown in block 307, and G is formed from $G_x$ and $G_y$. The MAC comprises information that is used to authenticate the generated base point x-coordinate, as described further below.

Alternatively, this whole procedure can be reversed where the y-coordinate $G_y$ is computed based on the first random part and the second part that includes the MAC. And then the x-coordinate $G_x$ can be computed from $G_y$ to form the final base point domain parameter G.

Assuring the Generated Basepoint Parameter is Valid

Not all values of the generated basepoint parameter G result are valid in that they do not result with an EC with acceptable characteristics. For example, some values for the base parameter result are vulnerable to specific attacks. Accordingly, after the generated base point parameter G=($G_x$, $G_y$) is generated, a determination is made as to whether the generated base point G is a valid domain parameter of the EC. This is illustrated in block 204 of FIG. 2A, and block 206 of FIG. 3A.

Figure 2D:
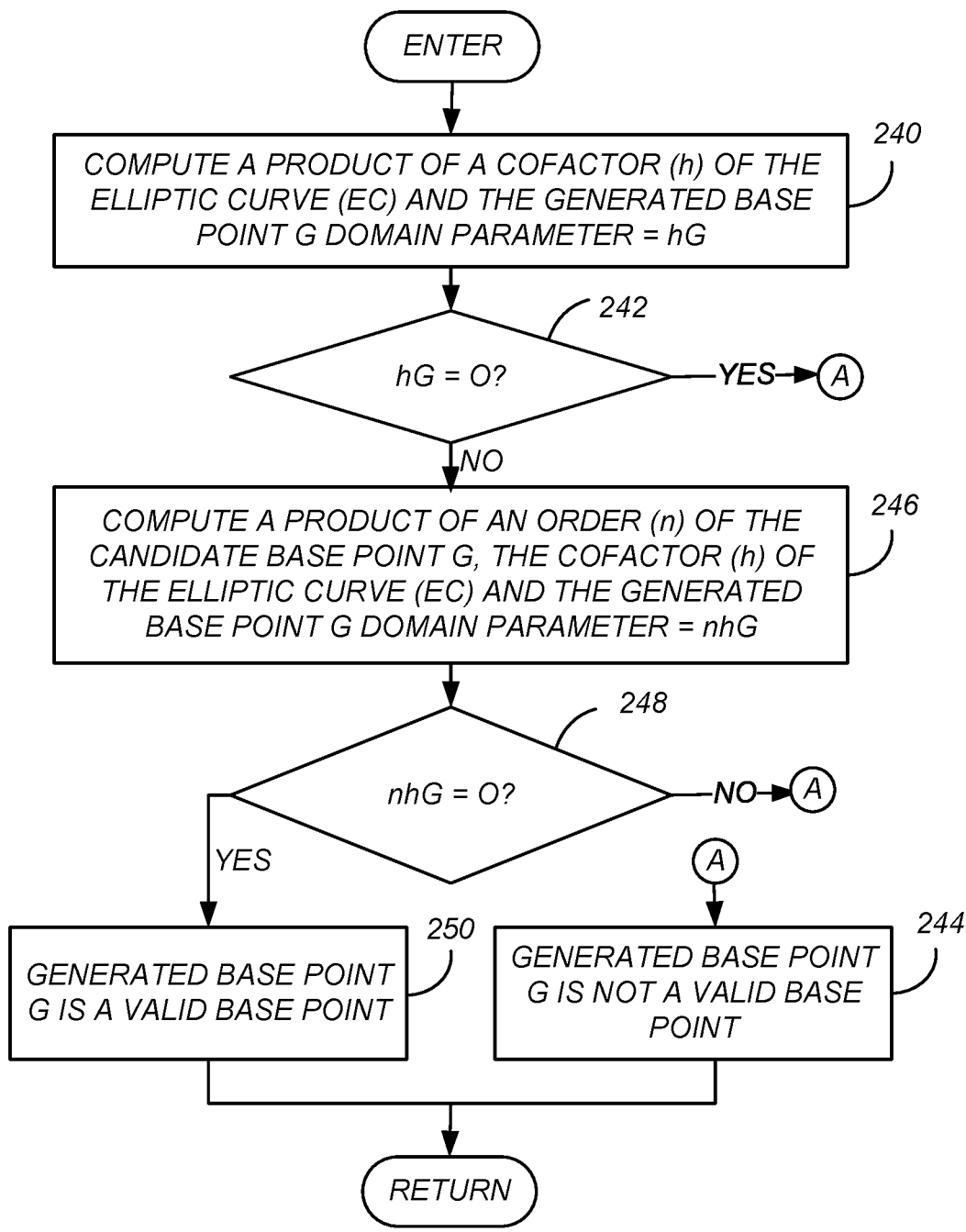

FIG. 2D is a diagram illustrating exemplary operations performed to determine if the generated base point is a valid domain parameter of the elliptic curve. The elliptic curve is a group which has cyclic subgroup E (defined by the base point G. The order of the base point G, is the smallest positive number n such that $nG=\mathcal{O}$ where $\mathcal{O}$ is the identity element. Since n is the size of the subgroup $E(\mathbb{F}_p)$, the cofactor $$h = \frac{1}{n}|E(F_p)|$$

is an integer.

In block 240, a product of the cofactor h of the EC and the generated base point G is computed. The result is hG. In block 242, it is determined whether hG is not O, the additive identify of the EC. If hG is the additive identity of the EC, processing is routed to block 244, and the generated base point G is determined not to be a valid base point. If hG is not the additive identity of EC, processing is routed to block 246, which computes a product of an order n of the candidate base point G, the cofactor h of the EC and the generated base point parameter G. Block 248 determines if the result, nhG is O, the additive identity of the EC, and if so processing is routed to block 250, and the generated base point G is determined to be a valid base point. If the result, nhG is not O, the additive identity of the EC, processing is routed to block 244, and the generated base point G is not determined to be a valid base point.

Returning to FIG. 2A, if the generated base point G is not determined to be a valid domain parameter of the EC, decision block 206 routes processing back to block 208, which commands the selection of another basepoint parameter G is generated. This is also illustrated in FIG. 3A by block 309. A new random value is selected for GRP_ID, combined with the validity period (VP), padded if necessary with PAD, and the process is repeated anew. This continues until a valid base point G has been determined. In the example illustrated in FIG. 3A, the base point domain parameter x-coordinate ($G_x$) is $G_x$=[GRP_ID||VP||PAD-||MAC] or a concatenated version of the GRP ID, VP, PAD and MAC values, and the generated base point domain parameter G is ($G_x$, $G_y$).

Returning to FIG. 2A, the generated base point domain parameter G is communicated to another entity for use in at least one EC based cryptographic operation, as shown in block 210. In the embodiment illustrated in FIG. 3A, this is accomplished by transmitting the generated base point domain parameter G from the first entity 102A to the second entity 102B and validating, in the second entity 102B, the generated base point domain parameter G using the base point domain parameter G second portion. In the illustrated embodiment, this is accomplished by use of the MAC.

Figure 2E:
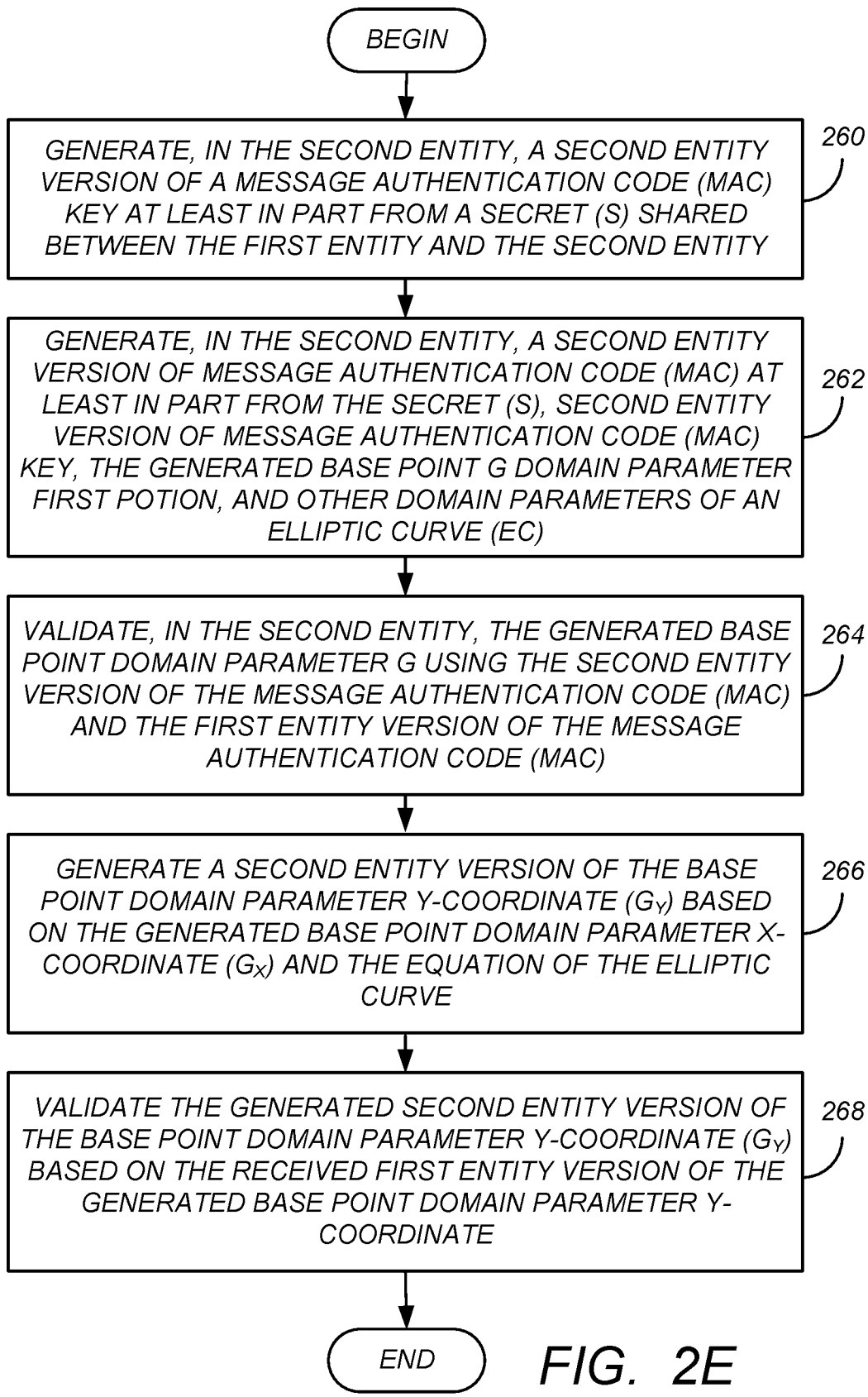

FIG. 2E is a diagram illustrating exemplary operations that can be performed to validate the generated base point domain parameter G received from the first entity 102A. In block 260, a second entity version of the MAC key is generated at least in part from the shared secret (S). This is also illustrated in block 302B of FIG. 3A.

In block 302B a second entity version of the MAC is generated at least in part from the second entity version of the MAC key generated in block 224. An embodiment of how this can be accomplished is shown in FIG. 3A. Block 306B performs an inverse function to that of block 306A, in this case, to separate the candidate base point domain parameter x-coordinate ($G_x$) first portion (in this case, having GRP_ID∥VP∥PAD) from the candidate base point x-coordinate ($G_x$) domain second portion (in this case, having the MAC). Block 306B provides the domain parameter first portion to the second entity's MAC generator 305B, which generates the second entity version of the MAC.

Returning to FIG. 2E, the received base point domain parameter x-coordinate ($G_x$) and any other information that was included within the base point domain parameter first portion is validated using the second entity's version of the MAC and the first entity's version of the MAC (received in the base point domain parameter second portion), as shown in block 264. This may be accomplished as shown in FIG. 3A, with block 306B providing the base point domain parameter x-coordinate second portion (the first entity's version of the MAC) to block 310. The MAC generated from the base point domain parameter first portion (GRP_ID∥VP∥PAD) is also provided to block 310. Block 310 compares the first entity version of the MAC to the second entity version of the MAC. If they are equal, the base point domain parameter x-coordinate first portion (having GRP_ID∥VP∥PAD∥) is valid. Furthermore, $G_y$ is recomputed from $G_x$ and the curve equation (thus generating a second entity version of $G_y$) and then compared to the received first entity version of $G_y$ to validate that the base point G is on the elliptic curve. This is illustrated in blocks 266 and 268 of FIG. 2E and blocks 310 and 312 of FIG. 3A.

After passing all the validation steps, G is provided for use by the second entity 102B. If any of the validation steps fail, then received G is not used. Second entity 102B may optionally transmit a message to first entity 102A indicating that the received G failed validation and will not be used.

In one embodiment, the foregoing update of G is performed when an update condition is met, for example, when the other of the first entity 102A and the second entity 102B or a third entity commands the update, or upon an expiration of time since the last update occurred. The update condition can also be specified in terms of the validity period (VP). For example, in embodiments where the validity period of the base point domain parameter is specified by VP, the second entity may store VP for further use. When the base point G is used for cryptographic computations, the VP can be checked to assure that the current time and date is within the validity period specified by the VP, and if it is not, initiate or request the generation of a new base point G.

Figure 3B:
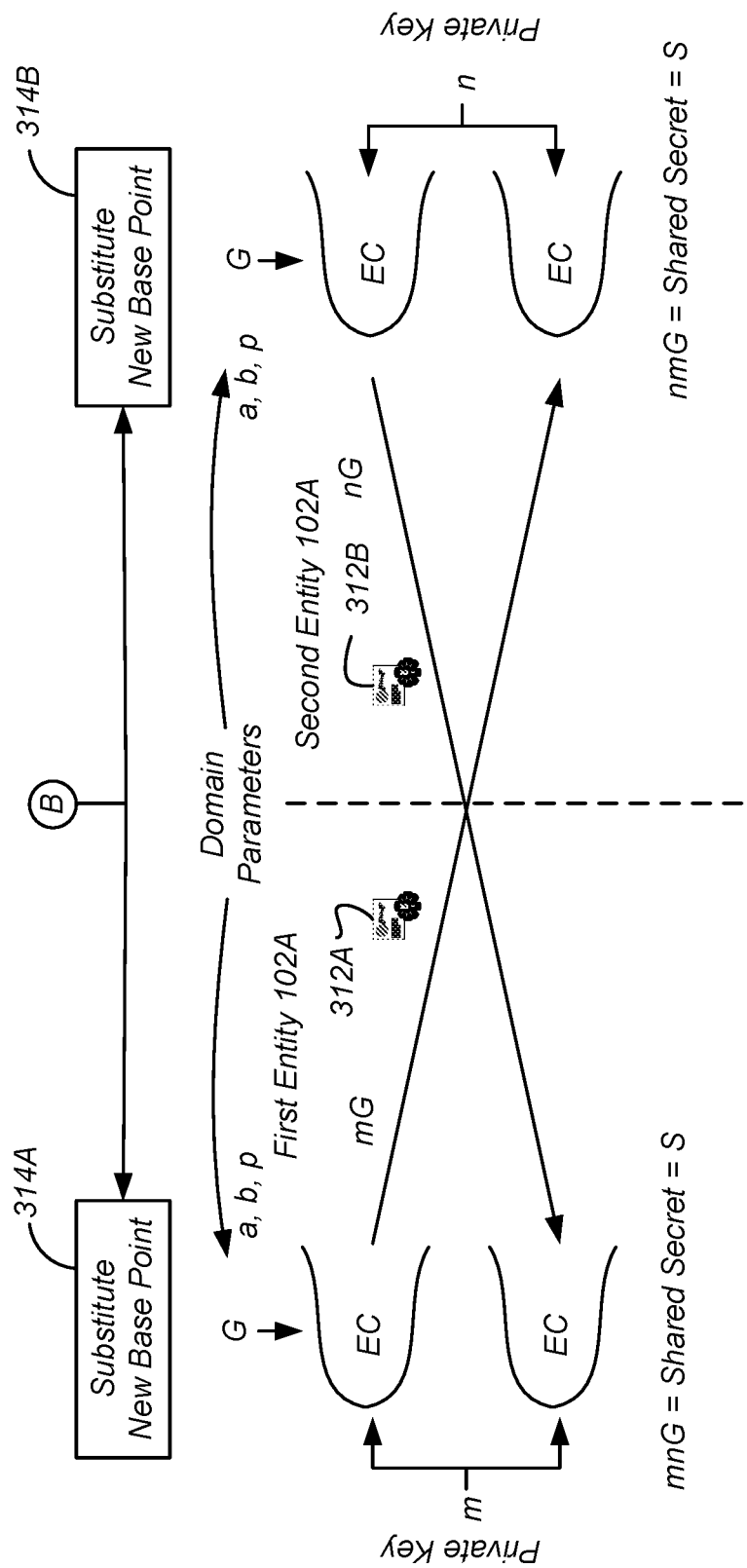

FIG. 3B is a diagram illustrating one embodiment of cryptographic operations can be performed using the new base point domain parameter G. In this embodiment, the new base point domain parameter G is used to perform another ECDH key exchange to generate a new shared secret S. The first entity 102A substitutes the newly generated base point domain parameter G for the former base point domain parameter ($G_0$), as shown in block 314A. The first entity 102A then uses the domain parameters (including the new base point domain parameter) to compute a new public key having value mG, where m is the first entity's private key and G represents the new base point G parameter. In the illustrated embodiment, the new base point x-coordinate ($G_x$) parameter is (GRP_ID∥VP∥PAD∥MAC), $G_y$ is computed based on $G_x$ and the curve equation and the new G=($G_x$, $G_y$) is formed. Similarly, the second entity 102B substitutes the newly obtained based point domain parameter G for the former base point domain parameter ($G_0$) if any, as shown in block 314B. The second entity 102B then uses the domain parameters (including the new base point domain parameter G) to compute a new second entity public key nG. The first entity 102A transmits the first entity public key mG to the second entity 102B and the second entity transmits the second entity public key nG to the first entity. The first entity 102A uses its private key m and the EC to compute the shared secret mnG and the second entity uses its private key m to compute its version of the shared secret nmG. Since the G was chosen to result in a valid EC, mnG is equal to nmG, and the first entity now have a shared secret S that can be used for further cryptographic operations.

Hardware Environment

Figure 4:
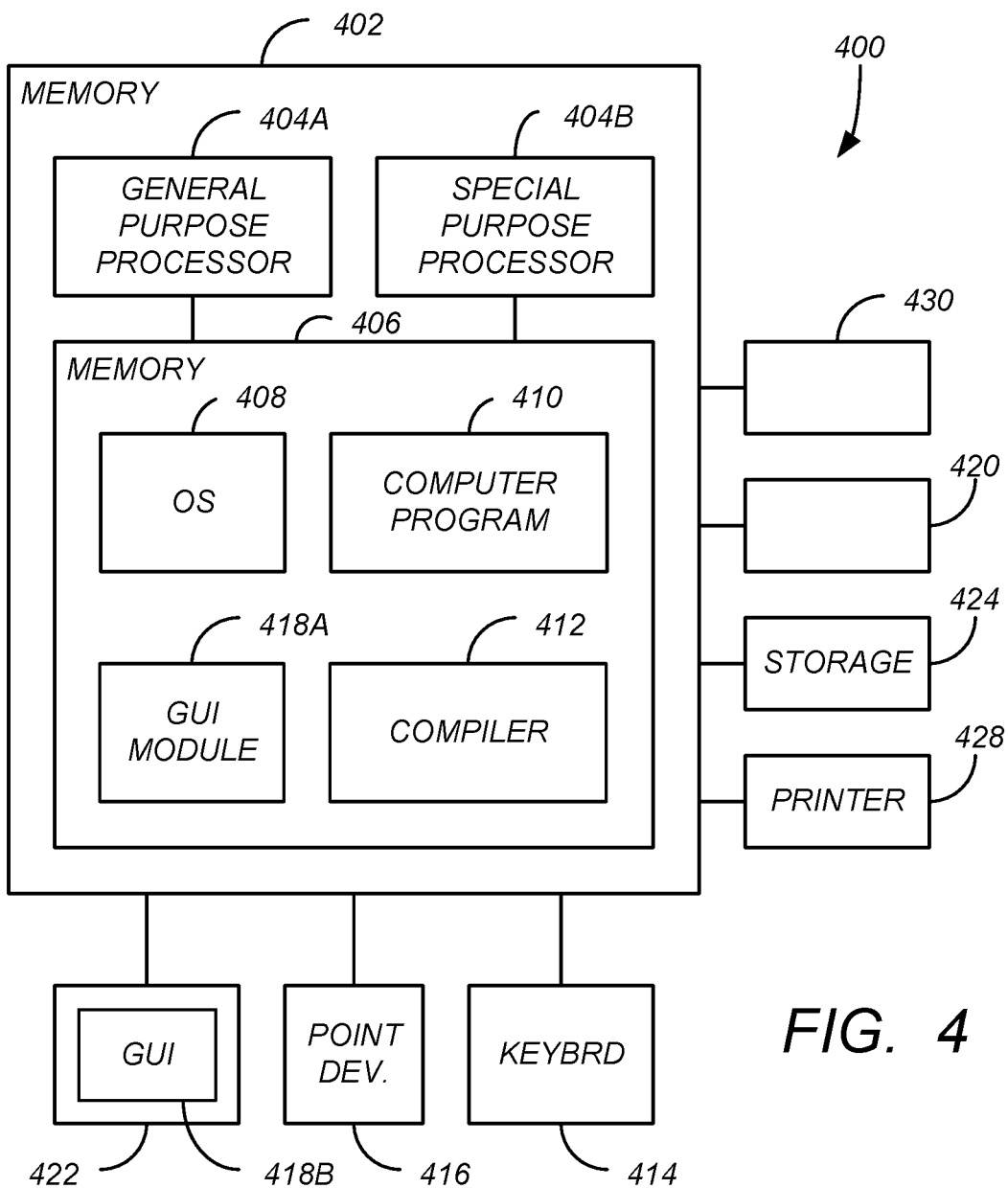
FIG. 4 is a diagram illustrating an exemplary computer system 400 that could be used to implement elements of the cryptographic system.

FIG. 4 is a diagram illustrating an exemplary computer system 400 that could be used to implement elements of the cryptographic system, including processors at the first entity 402A and/or the second entity 402B. The computer can form part of an encoder in a video signal processor, with encryption performed using the EC that is described herein. The encoder can encode and encrypt streaming video data. The computer 402 comprises a general purpose hardware processor 404A and/or a special purpose hardware processor 404B (hereinafter alternatively collectively referred to as processor 404) and a memory 406, such as random access memory (RAM). The computer 402 may be coupled to other devices, including input/output (I/O) devices such as a keyboard 414, a mouse device 416 and a printer 428.

In one embodiment, the computer 402 operates by the general purpose processor 404A performing instructions defined by the computer program 410 under control of an operating system 408. The computer program 410 and/or the operating system 408 may be stored in the memory 406 and may interface with the user and/or other devices to accept input and commands and, based on such input and commands and the instructions defined by the computer program 410 and operating system 408 to provide output and results.

Output/results may be presented on the display 422 or provided to another device for presentation or further processing or action. In one embodiment, the display 422 comprises a liquid crystal display (LCD) having a plurality of separately addressable pixels formed by liquid crystals. Each pixel of the display 422 changes to an opaque or translucent state to form a part of the image on the display in response to the data or information generated by the processor 404 from the application of the instructions of the computer program 410 and/or operating system 408 to the input and commands. Other display 422 types also include picture elements that change state in order to create the image presented on the display 422. The image may be provided through a graphical user interface (GUI) module 418A. Although the GUI module 418A is depicted as a separate module, the instructions performing the GUI functions can be resident or distributed in the operating system 408, the computer program 410, or implemented with special purpose memory and processors.

Some or all of the operations performed by the computer 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 402 may also implement a compiler 412 which allows an application program 410 written in a programming language such as COBOL, C++, FORTRAN, or other language to be translated into processor 404 readable code. After completion, the application or computer program 410 accesses and manipulates data accepted from I/O devices and stored in the memory 406 of the computer 402 using the relationships and logic that was generated using the compiler 412.

The computer 402 also optionally comprises an external communication device such as a modem, satellite link, Ethernet card, or other device for accepting input from and providing output to other computers.

In one embodiment, instructions implementing the operating system 408, the computer program 410, and/or the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, or a flash drive. Further, the operating system 408 and the computer program 410 are comprised of computer program instructions which, when accessed, read and executed by the computer 402, causes the computer 402 to perform the steps necessary to implement and/or use the present invention or to load the program of instructions into a memory, thus creating a special purpose data structure causing the computer to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 402.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of selecting a base point domain parameter $G=(G_x, G_y)$ of an elliptic curve (EC) for use in elliptic curve cryptography for encoding video data, comprising:
   (a) generating a candidate base point domain parameter G of an elliptic curve (EC), comprising:
     generating a candidate base point domain parameter x coordinate ($G_x$) of an elliptic curve (EC), the base point domain parameter x coordinate ($G_x$) comprising:
       a candidate base point domain parameter x coordinate ($G_x$) first portion; and
       a candidate base point domain parameter x coordinate ($G_x$) second portion;
       wherein at least a portion of the candidate base point domain parameter x-coordinate ($G_x$) first portion is random and the candidate base point domain parameter x-coordinate ($G_x$) second portion comprises information for authenticating the generated candidate base point domain parameter G;
     generating at least one of two possible base point domain parameter y-coordinates ($G_y$) based on the candidate base point domain parameter x-coordinate ($G_x$) and an equation of the elliptic curve;
   (b) determining if the generated candidate base point domain parameter $G=(G_x, G_y)$ is a valid domain parameter of the elliptic curve (EC);
   (c) if the generated candidate base point domain parameter G is a not a valid base point domain parameter G; selecting another base point domain parameter G first portion; and
     repeating steps (a)-(c); and
   (d) if the generated base point domain parameter G is a valid base point domain parameter G, selecting the generated candidate base point domain parameter G and communicating the generated base point domain parameter G to another entity for use as the generated base point domain parameter G in at least one EC based cryptographic operation; and
   (e) using the base point domain parameter G of the EC to encrypt and encode video data; where
   (f) steps (a)-(d) are performed to select an updated base point domain parameter G according to an update condition comprising an expiration of time and a command from a third entity.

2. The method of claim 1, wherein determining if the generated candidate base point domain parameter G is a valid domain parameter of the elliptic curve (EC) comprises:
   computing a product of a cofactor (h) of the elliptic curve (EC) and the generated candidate base point domain parameter G;
   computing a product of an order (n) of the generated candidate base point domain parameter G, the cofactor (h) of the elliptic curve (EC) and the generated candidate base point domain parameter G; and
   determining that the generated candidate base point domain parameter G is a valid base point domain parameter G only if the product of a cofactor (h) of the elliptic curve (EC) and the generated base point domain parameter G is not an additive identity of the elliptic curve (EC) and if the product of the order (n) of the generated base point domain parameter G, the cofactor (h) of the elliptic curve and the generated base point domain parameter G is the additive identity of the elliptic curve (EC), otherwise determine that the generated candidate base point parameter G is not a valid domain parameter.

3. The method of claim 2, wherein:
   steps (a)-(d) are performed by first entity and the another entity is a second entity, and the method further comprises:
   communicating the generated base point domain parameter G to another entity for use as the generated base point domain parameter G in at least one EC based cryptographic operation comprises:
      transmitting the generated base point domain parameter G from the first entity to the second entity; and
      validating, in the second entity, the generated base point domain parameter G using the base point domain parameter G second portion.

4. The method of claim 3, wherein:
   the candidate base point domain parameter x coordinate $(G_x)$ first portion comprises at least one of an identifier of domain parameters of the elliptic curve and session parameters; and
   the second portion comprises a message authentication code (MAC).

5. The method of claim 4, wherein the domain parameters identifier is a group identifier for a communication group sharing the domain parameters.

6. The method of claim 4, wherein the session parameters include a validity period of the base point domain parameter G.

7. The method of claim 4, wherein the candidate base point domain parameter x-coordinate $(G_x)$ second portion comprises the message authentication code (MAC) and wherein:
   generating the base point domain parameter G of an elliptic curve (EC) comprises:
      generating, in the first entity, a first entity version of a message authentication code (MAC) key at least in part from a secret (S) shared between the first entity and the second entity;
      generating, in the first entity, the candidate base point domain parameter x-coordinate $(G_x)$ first portion; and
      generating, in the first entity, a first entity version of a message authentication code (MAC) at least in part from the first entity version of message authentication code (MAC) key and the candidate base point domain parameter x-coordinate $(G_x)$ first portion.

8. The method of claim 7, wherein, validating, in the second entity, the generated base point domain parameter (G) using the base point domain parameter (G) second portion comprises:
   generating, in the second entity, a second entity version of the message authentication code (MAC) key from the secret (S);
   generating, in the second entity, a second entity version of the message authentication code (MAC) from the second entity version of the message authentication code (MAC) key and the candidate base point domain parameter x-coordinate $(G_x)$ first portion;
   validating, in the second entity, the generated base point domain parameter x-coordinate $(G_x)$ using the second entity version of the message authentication code (MAC) and the first entity version of the message authentication code (MAC);
   generating a second entity version of the base point domain parameter y-coordinate $(G_y)$ based on the generated base point domain parameter x-coordinate $(G_x)$ and the equation of the elliptic curve; and
   validating, in the second entity, the generated second entity version of the base point domain parameter y-coordinate $(G_y)$ based on the received first entity version of the generated base point domain parameter y-coordinate;
   wherein the generated basepoint domain parameter G is used in the at least one EC based cryptographic operation only if the generated base point domain parameter x-coordinate $(G_x)$ and the generated base point domain parameter y-coordinate $(G_y)$ is valid.

9. An apparatus for selecting a base point domain parameter $G=(G_x, G_y)$ of an elliptic curve (EC), comprising:
   a processor provided in a video encoder;
   a memory, communicatively coupled to the processor, the memory storing processor instructions including processor instructions for coding video data using elliptic curve cryptography, the instructions further for:
   (a) generating a candidate a base point domain parameter G of an elliptic curve (EC), comprising:
      generating a candidate base point domain parameter x coordinate $(G_x)$ of an elliptic curve (EC), the base point domain parameter x coordinate $(G_x)$ comprising:
         a candidate base point domain parameter x coordinate $(G_x)$ first portion; and
         a candidate base point domain parameter x coordinate $(G_x)$ second portion;
         wherein at least a portion of the candidate base point domain parameter x-coordinate $(G_x)$ first portion is random and the candidate base point domain parameter x-coordinate $(G_x)$ second portion comprises information for authenticating the generated candidate base point domain parameter G;
      generating at least one of two possible base point domain parameter y-coordinates $(G_y)$ based on the base point domain parameter x-coordinate $(G_x)$ and an equation of the elliptic curve;
   (b) determining if the generated candidate base point domain parameter $G=(G_x, G_y)$ is a valid domain parameter of the elliptic curve (EC);
   (c) if the generated candidate base point domain parameter G is a not a valid base point domain parameter G;
      selecting another base point domain parameter G first portion; and
      repeating steps (a)-(c); and
   (d) if the generated base point domain parameter G is a valid base point domain parameter G, selecting the generated candidate base point domain parameter G and communicating the generated base point domain parameter G to another entity for use as the generated base point domain parameter G in at least one EC based cryptographic operation; wherein (e) the instructions for determining if the generated candidate base point domain parameter G is a valid domain parameter of the elliptic curve (EC) comprise instructions for:

computing a product of a cofactor (h) of the elliptic curve (EC) and the generated candidate base point domain parameter G;

computing a product of an order (n) of the generated candidate base point domain parameter G, the cofactor (h) of the elliptic curve (EC) and the generated candidate base point domain parameter G; and determining that the generated candidate base point domain parameter G is a valid base point domain parameter G only if the product of a cofactor (h) of the elliptic curve (EC) and the generated base point domain parameter G is not an additive identity of the elliptic curve (EC) and if the product of the order (n) of the generated base point domain parameter G, the cofactor (h) of the elliptic curve and the generated base point domain parameter G is the additive identity of the elliptic curve (EC), otherwise determine that the generated candidate base point parameter G is not a valid domain parameter.

10. The apparatus of claim 9, wherein:

the processor is disposed at a first entity;

the apparatus comprises a second processor disposed at a second entity, the second processor communicatively coupled to a second memory storing second processor instructions;

the processor instructions for communicating the generated base point domain parameter G to another entity for use as the generated base point domain parameter G in at least one EC based cryptographic operation comprise instructions for:

transmitting the generated base point domain parameter G from the first entity to the second entity; and the second processor instructions comprise instructions for:

validating, in the second entity, the generated base point domain parameter G using the base point domain parameter G second portion.

11. The apparatus of claim 10, wherein:

the candidate base point domain parameter x coordinate ($G_x$) first portion comprises at least one of a group identifier of domain parameters of the elliptic curve and session parameters; and the second portion comprises a message authentication code (MAC).

12. The apparatus of claim 11, wherein the domain parameters identifier is a group identifier for a communication group sharing the domain parameters.

13. The apparatus of claim 11, wherein the session parameters include a validity period of the base point domain parameter G.

14. The apparatus of claim 11, wherein the candidate base point domain parameter x-coordinate ($G_x$) second portion comprises the message authentication code (MAC) and wherein:

the processor instructions for generating the base point domain parameter G of an elliptic curve (EC) comprises:

generating, in the first entity, a first entity version of a message authentication code (MAC) key at least in part from a secret (S) shared between the first entity and the second entity;

generating, in the first entity, the candidate base point domain parameter x-coordinate ($G_x$) first portion; and generating, in the first entity, a first entity version of a message authentication code (MAC) at least in part from the first entity version of message authentication code (MAC) key and the candidate base point domain parameter x-coordinate ($G_x$) first portion.

15. The apparatus of claim 14, wherein the second processor instructions for validating, in the second entity, the generated base point domain parameter G using the base point domain parameter (G) second portion comprise instructions for:

generating, in the second entity, a second entity version of the message authentication code (MAC) key from the secret (S);

generating, in the second entity, a second entity version of the message authentication code (MAC) from the second entity version of the message authentication code (MAC) key and the candidate base point domain parameter x-coordinate ($G_x$) first portion;

validating, in the second entity, the generated base point domain parameter x-coordinate ($G_x$) using the second entity version of the message authentication code (MAC) and the first entity version of the message authentication code (MAC);

generating a second entity version of the base point domain parameter y-coordinate ($G_y$) based on the generated base point domain parameter x-coordinate ($G_x$) and the equation of the elliptic curve; and validating, in the second entity, the generated second entity version of the base point domain parameter y-coordinate ($G_y$) based on the received first entity version of the generated base point domain parameter y-coordinate;

wherein the generated basepoint domain parameter G is used in the at least one EC based cryptographic operation only if the generated base point domain parameter x-coordinate ($G_x$) and the generated base point domain parameter y-coordinate ($G_y$) is valid.

16. The apparatus of claim 9, wherein steps (a)-(d) are performed to select an updated base point domain parameter G according to an update condition comprising:

an expiration of time; and a command from a third entity.

\* \* \* \* \*